United States Patent
Kotake et al.

[11] Patent Number: 5,248,926
[45] Date of Patent: Sep. 28, 1993

[54] CONTROL APPARATUS FOR INDUCTION MOTOR AND ELECTRIC ROLLING STOCK

[75] Inventors: Kazuyoshi Kotake; Takeshi Kawazoe, both of Katsuta; Tadashi Takaoka, Ibaraki, all of Japan

[73] Assignee: Hitachi, Ltd., Tokyo, Japan

[21] Appl. No.: 686,372

[22] Filed: Apr. 17, 1991

[30] Foreign Application Priority Data

Apr. 18, 1990 [JP] Japan .................................. 2-100330

[51] Int. Cl.$^5$ .............................................. H02P 5/46
[52] U.S. Cl. ...................................... 318/807; 318/52
[58] Field of Search ............... 318/52, 71, 778, 599, 318/805, 811, 803, 807, 809, 798, 723

[56] References Cited

FOREIGN PATENT DOCUMENTS

57-16681 10/1982 Japan .

*Primary Examiner*—William M. Shoop, Jr.
*Assistant Examiner*—John W. Cabeca
*Attorney, Agent, or Firm*—Antonelli, Terry, Stout & Kraus

[57] ABSTRACT

A control apparatus for an electric rolling stock makes it possible to use a single associated train in a variety of transit services including an express transit service to an accommodation train service. The apparatus comprises an induction motor controlled by an inverter. For an express transit operation (over a long inter-station distance), the ratio of output voltage and the frequency of the inverter is decreased to thereby increase a command current in a variable voltage/variable frequency region. For the accommodation train operation (over short inter-station distance), a control pattern reverse to the above is adopted. The electric rolling stock can adapt itself to the running conditions. Besides, the problem of overheating of the induction motor can be solved successfuly.

17 Claims, 6 Drawing Sheets

CONTROL APPARATUS FOR INDUCTION MOTOR AND ELECTRIC ROLLING STOCK

BACKGROUND OF THE INVENTION

The present invention relates to a control apparatus for electric rolling stock driven by an induction motor which is powered through an inverter of a variable voltage variable frequency.

In recent years, an inverter of variable voltage/variable frequency (known as VVVF inverter for short) which is designed for converting a DC power to an AC power of variable voltage/variable frequency to drive an induction motor is extensively employed in the electric rolling stock such as electric railcars. In this conjunction, an output torque T of the induction motor is given by $$T \alpha (V/F_{INV})^2 F_S \quad (1)$$

where
V represents a motor voltage,
$F_{INV}$ represents an inverter frequency, and
$F_S$ represents a slip frequency.

The above expression (1) means that the output torque of the induction motor can be controlled by regulating the voltage/frequency ratio $V/F_{INV}$ or the slip frequency $F_S$.

In general, as a method of controlling the electric rolling stock, constant-torque control methods are adopted. According to one of the most popular constant torque control methods, the induction motor is driven over a plurality of divided regions, i.e. a region (constant torque region) in which a constant torque is derived by maintaining the ratio $V/F_{INV}$ and the slip frequency $F_S$ to be constant at respective predetermined values, a region (constant output region) in which after the motor voltage V has attained a predetermined maximum value, the torque T is controlled in inverse proportion to the inverter frequency $F_{INV}$ while maintaining constant the ratio $F_S/F_{INV}$ (i.e. motor current I), and a region (referred to as the characteristic region) where the torque T is controlled in inverse proportion to a square of the inverter frequency $F_{INV}$ while maintaining constant the voltage V at the predetermined maximum value and the slip frequency $F_S$ at a constant value.

As an approach for operating the inverter in conformance with the characteristics of a given induction motor, there is proposed in JP-A-57-166881 an apparatus for varying the very value of the constant torque by changing the value of $V/F_{INV}$ in the constant torque region.

Needless to say, the performance of the electric rolling stock is determined in dependence on the types of trains and the operations for which the rolling stock is intended. By way of example, for a long-distance transit service and an express train service, an electric rolling stock which can exhibit an improved high-speed performance at the expense of acceleration performance should be selected, while for a short-distance commuter train service, such an electric rolling stock should be selected which is excellent in respect to the acceleration behavior rather than the high-speed performance. For a medium-distance express train service, an electric rolling stock having medium performances may be selected.

Such being the circumstances, there will arise no problems so far as the electric rolling stock having the performances such as mentioned above are used for the applications and purposes to which they are intrinsically intended. At the present state, however, electric rolling stock having fixed performances actually employed in a variety of train operations and services. By way of example, a short-distance commuter rolling stock is used for the intermediate-distance high-speed or express train service, while an electric rolling stock designed for an intermediate-distance high-speed or express service is employed as a short-distance commuter train.

When an electric rolling stock is used for the train operations and the services or transit to which the intrinsic performance of the electric rolling stock is not suited, the latter will necessarily be operated in the region or condition for which it can exhibit only poor performance. Secondly, it is noted that the induction motor is often imposed with heavy loads because the electric rolling stock is frequently operated in the region for which the performance of the motor is poor.

It is now assumed, for example, that a short-distance commuter train type electric rolling stock is used for an intermediate distance train service. In this conjunction, it is noted that the induction motor is generally imposed with a maximum permissible rotation speed. Consequently, the above assumption means that electric rolling stock having a high gear ratio is operated in a high-speed range with an increased frequency. To say in another way, the short-distance commuter train type electric rolling stock is operated over an extended time at a speed in the vicinity of the maximum rotation number of the induction motor. In that case, the use life of the induction motor will apparently be shortened. Besides, due to occurrence of significant vibrations during the operation, individual parts of the driving unit tend to become loose. Further, the poor acceleration performance in the high-speed range is accompanied with considerably bad economy.

On the other hand, when an electric rolling stock designed for an intermediate-distance train service is used in a short-distance train, acceleration mode in the start or initial running phase is effectuated frequently, which will eventually incur an overheat failure of the induction motor. This problem may be solved by increasing the number of the electric rolling stocks with the respective induction motors which are employed in a train, which is however very expensive.

SUMMARY OF THE INVENTION

It is therefore an object of the present invention to provide an electric rolling stock control apparatus which allows one and the same electric rolling stock to be used for a variety of operations or transit services with performances suited therefor without increasing significantly the load imposed on the induction motor.

Another object of the invention is to provide an electric rolling stock controlling apparatus which is capable of automatically changing the intrinsic performances of electric rolling stock in conformance with the conditions imposed upon runnings.

In view of the above and other objects which will be apparent as description proceeds, there is provided according to an aspect of the invention, an electric rolling stock control apparatus which comprises an inverter of variable voltage/variable frequency, an induction motor controlled by the inverter, a frequency regulator for regulating a slip frequency of the induction motor so that the motor current follows a current command, a frequency generator for generating an operation frequency of the above-mentioned inverter on the basis of the slip frequency and the rotational speed (rpm) of the induction motor or a value equivalent thereto, and means for causing the inverter to output a voltage proportional to the inverter operation frequency, and a unit for changing a tractive effort of the electric rolling stock for the inverter frequency or equivalent value thereof in accordance with a running performance of the electric rolling stock.

According to another aspect of the invention, there is provided an electric rolling stock control apparatus which comprises an inverter of variable voltage/variable frequency, an induction motor controlled by the inverter, a frequency regulator for regulating a slip frequency of the induction motor so that the motor current follows a current command, a frequency generator for generating an operation frequency of the above-mentioned inverter on the basis of the slip frequency and rotational speed of the induction motor or a value equivalent thereto, a voltage generating circuit storing a plurality of ratios between the inverter frequencies and the inverter output voltages for generating a given one of the ratios, a current pattern generating circuit storing a plurality of current command patterns corresponding to the inverter frequencies for generating a given one of the patterns, a storage unit for storing running patterns on a railway on which the electric rolling stock travels, and a device for changing over the ratios of the inverter frequencies and the output voltages as well as the command current patterns.

The above-mentioned objects can certainly be accomplished by changing the gear ratios in accordance with the intended operations as well, which is however disadvantageous and unrealistic as pointed out hereinbefore.

With the arrangements of the control apparatus according to the invention, the tractive effort for the inverter frequency or the equivalent value thereof can be varied in accordance with the running modes of the electric rolling stock, whereby the speed vis-á-vis tractive effort characteristic can be realized in correspondence to the train operation and the transit service in which the electric rolling stock is actually used.

In a preferred embodiment of the invention, the running patterns on railroads may be stored so that the ratios of the inverter frequencies and the output voltages as well as the command current patterns can be changed over in conformance with the selected one of the patterns. Thus, there can be realized the speed vis-á-vis tractive effort characteristics which are in conformance with the train operations.

In this way, because the tractive effort characteristics of the electric rolling stock can be changed so as to meet the conditions imposed by the railroads and the train operations, appropriate control of the train running speed, applicability of the electric rolling stock to a variety of transit services and reduction in the power consumption can be accomplished.

By virtue of the features mentioned above, realization of reduction in the train operation time or high density train operation increasingly demanded at present as a social infrastructural requirement can be much facilitated by the capability of time-punctual scheduled operation as well as operation recovery capability which can be imparted according to the teachings of the invention, providing a great contribution to this industrial field.

DESCRIPTION OF THE PREFERRED EMBODIMENTS

The concept underlying exemplary or preferred embodiments of the present invention will be described in detail by reference to FIGS. 2, 3 and 4.

Figure 4:
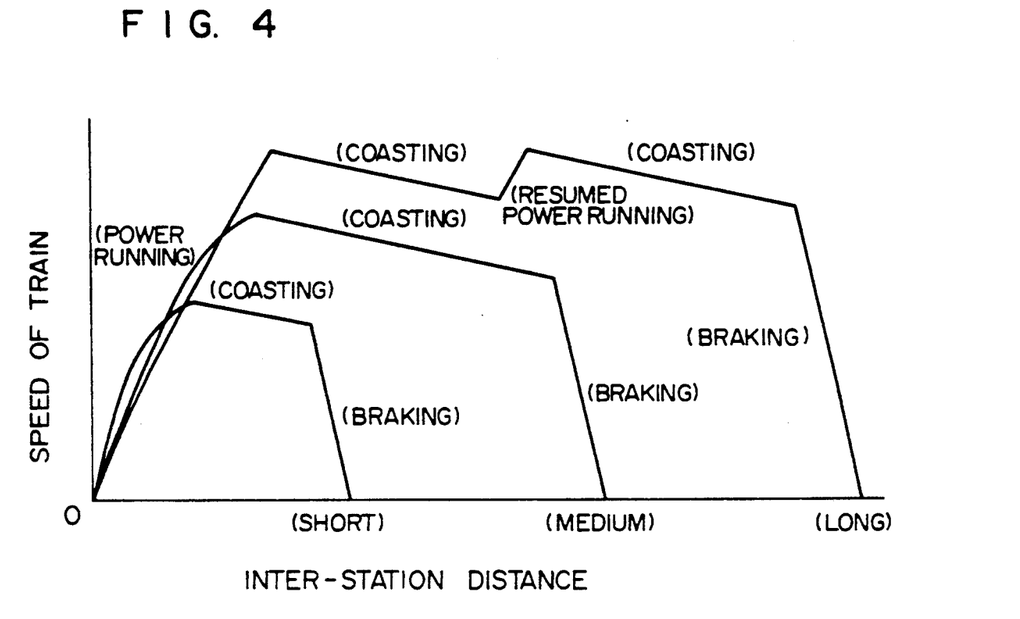
FIG. 4 is a view for illustrating graphically running patterns of electric rolling stock.

At first, description will be directed to different operation characteristics of electric rolling stock by reference to FIG. 4 which shows a standard of electric rolling stock running patterns (scheduled train operation patterns) as a function of inter-station distances on the assumption that the electric rolling stock is operated for an urban transit train, by way of example.

As will be seen in FIG. 4, when the interstation distance is as short as on the order of 1 km, acceleration upon starting of the electric rolling stock is increased while there is no need for increasing acceleration in a high-speed range. On the other hand, when the inter-station distance is as long as 3 km or more, acceleration in the intermediate and high speed ranges is high with the acceleration upon starting of the train being low.

In case the inter-station distance is of a medium length on the order of 2 km, the acceleration performance or characteristic intermediate between the two cases mentioned above is adopted. For realizing the running performances mentioned above by using one and the same induction motor, a transmission gear ratio is set at a large value for a short distance transit while it is set at a small value for a long distance transit.

Typical operation patterns are summarized in the following table.

TABLE

[Operation Patterns of Urban Train]

| INTER-STATION DISTANCE | MAX. ACCELERATION | END SPEED AFTER MAX. ACCELERATION | TRACTIVE EFFORT OF TRACTION MOTOR AT RATED CURRENT | SPEED UPON TRANSITION TO COASTING | SPEED AT THE TIME OF BRAKING |
|---|---|---|---|---|---|
| short (ca. 1 km) | high (ca. 3 km/h · s) | low (ca. 40 km/h) | great (ca. 500 N/t) | low (ca. 70 km/h) | low (ca. 55 km/h) |
| medium (ca. 2 km) | intermediate (ca. 2.5 km/h · s) | intermediate (ca. 50 km/h) | medium (ca. 450 N/t) | intermediate (ca. 90 km/h) | intermediate (ca. 70 km/h) |
| long (longer than ca. 3 km) | low (ca. 2 km/h · s) | high (ca. 60 km/h) | small (ca. 400 N/t) | high (ca. 110 km/h) | high (ca. 90 km/h) |

When an electric rolling stock is used for a short-distance commuter train service, acceleration in a high-speed range or interval need not be high. However, the acceleration upon starting of the train should desirably be as high as possible without increasing significantly the load imposed on the traction motor. On the contrary, when the electric rolling stock is to be used for the medium-distance high-speed and express train services, the acceleration upon starting of the train need not appreciably be high, but the acceleration should preferably be increased in the intermediate and high speed ranges without involving significant increasing in the load of the traction motor. High acceleration in the intermediate and high speed ranges means that correspondingly increased tractive effort is available in these ranges, which in turn means that the maximum train speed can be increased by taking into account topographical factors of the districts through which the train is to run.

As the reasons for changing the train operation performance in conformance with the transit service as intended, there may first be mentioned the limitation imposed on the size or capacity of the induction electric motor. (In this conjunction, it will be understood that a greater capacity of the induction motor allows acceleration to be increased in the low speed range as well as the intermediate and high speed ranges, although a problem may arise from the practical and economical viewpoint.) Next, a problem of the load (temperature rise) of the induction motor must be considered. By way of example, in the case when the induction motor does work (high acceleration) in the low speed range, duration the of the work is relatively short, which is then followed by coasting and braking operations, and in the meanwhile, the induction motor is cooled. Further, in case the motor is made to work (resumed power running) in the intermediate speed range, the heat generation is small because the acceleration upon starting is suppressed to be low. Besides, the coasting operation of a longer duration can ensure cooling of the induction motor. In contrast, when the same electric rolling stock is used for the utterly contrary service, the time interval during which heat is generated by the motor becomes out of balance with the time period during which the motor is cooled, which is of course undesirable not only from the economical viewpoint but also in view of the possibility of the motor being overheated. For these reasons, there are established correspondences between the operation performances of the electric rolling stock and the applications or services for which it is intended.

In order to realize the operation performances of an electric rolling stock illustrated in FIG. 4 (in order to comply with the running patterns), it is necessary to vary or change the characteristic of the tractive effort (i.e. the motor torque) for the inverter frequencies (substantially equal to the running speed of the electric rolling stock).

Figure 2:
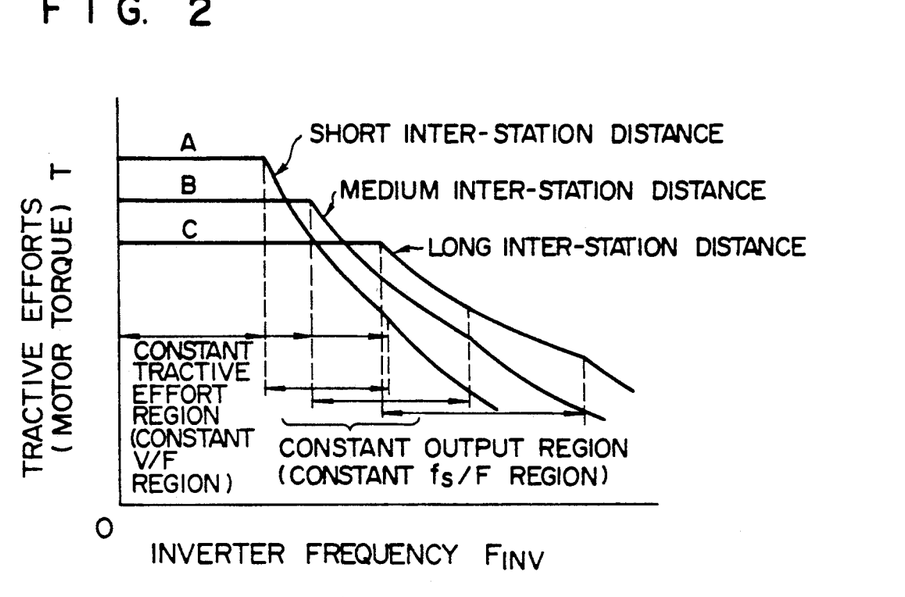
FIG. 2 is a view for illustrating graphically tractive effort characteristics of electric rolling stock.

FIG. 2 shows graphically relations between the inverter frequency and the tractive effort.

In this figure, a curve A represents the relation set up for the electric rolling stock of a train for a short-distance commuter service. As can be seen from this curve, the tractive effort is set at a large value in the low speed range, while the range in which the tractive effort is maintained constant is set short. Further, in the high speed range, the tractive effort is set to be small. On the other hand, a curve C represents the relation in the case where the electric rolling stock is used in a train for a long-distance express (super-express) transit service. This curve C shows that the tractive effort is small in the low speed range, the range in which a constant tractive effort is maintained is extended, and the tractive effort is set large in the high speed range as well.

In an inverter-controlled induction motor, the following relations apply:

$$T \alpha (V/F_{INV})^2 \cdot F_S \quad (1)$$

$$I \alpha V \cdot F_S / F_{INV} \quad (2)$$

In a region where $V/F_{INV}$ is constant, the torque T can be changed by varying the value (proportional factor) $F_S$.

Next, description will be made concerning the tractive effort in a frequency region which is higher than that at which the output voltage V has reached a predetermined value.

From the expressions (1) and (2) mentioned above, there can be derived:

$$T \alpha I \cdot V/F_{INV} \quad (3)$$

When the output voltage V has attained a maximum constant value, the inverter frequency $F_{INV}$ increases as a function of the running speed. Accordingly, it is possible to control the torque T by regulating or adjusting the output current I, as can be seen from expression (3).

Figure 3:
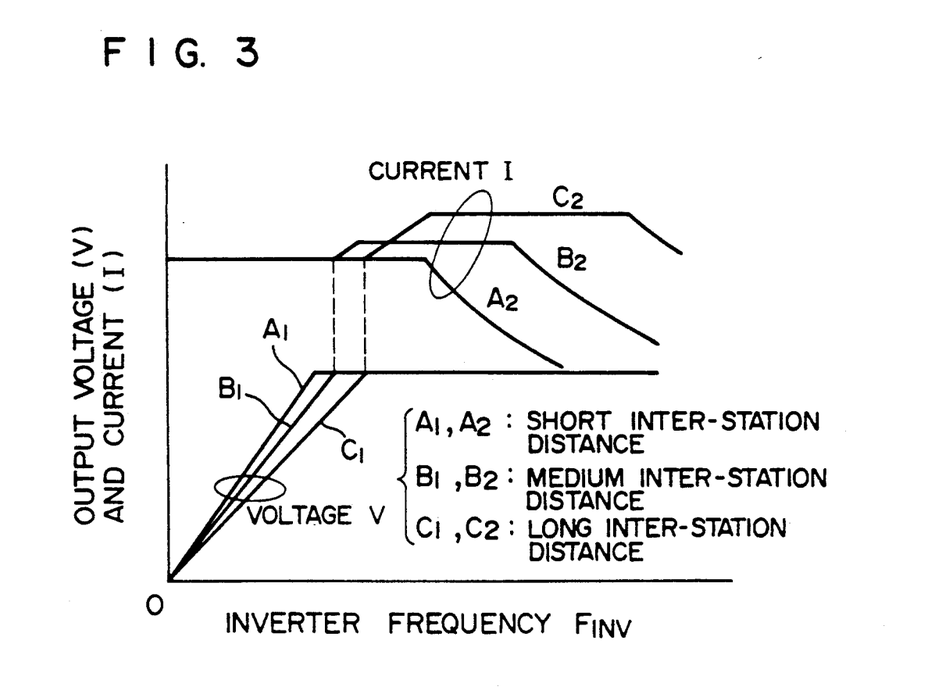
FIG. 3 is a view for illustrating graphically output voltage/current patterns adopted in carrying out the invention.

FIG. 3 graphically illustrates the inverter frequency vis-á-vis output voltage (V) and current (I) characteristics for realizing the operation modes illustrated in FIG. 2.

The curves A, B and C shown in FIG. 2 correspond to curves $A_1$, $A_2$; $B_1$, $B_2$ and $C_1$, $C_2$, respectively.

In case the inter-station distance is short (corresponding to the short-distance commuter train service), the electric rolling stock will soon arrive at the next station. Accordingly, the maximum speed (acceleration in the high speed range) need not be high. It is thus possible to increase the torque generated by the motor by increasing the ratio $V/F_{INV}$ in the low speed range (refer to the curve $A_1$). At that time, however, since heat is generated by the induction motor, it is preferred to perform a constant current control of the motor with a value of the current I which affords a margin to the capacity of the motor till a constant output region and decrease the current value early in the characteristic region (refer to curve $A_2$). This is for the purpose of mitigating the burden imposed on the electric motor (refer to the curve $A_2$).

In case the inter-station distance is long (for a long distance express train operation), the average train speed does not become appreciably low even when the acceleration upon starting of the train is low because of a long distance to the station at which the train is to stop (because of a long duration of the running at the highest speed). Accordingly, a margin for thermal load can be afforded to the induction motor by setting the ratio $V/F_{INV}$ at a small value in a variable voltage/variable frequency range (curve $C_1$). Subsequently, when a range is attained in which the voltage V is constant, the current I is increased by an amount equivalent to the margin afforded to the induction motor (so that the torque becomes constant), whereon upon reaching the constant output region, the current I is set to a high value which does not exceed the permissible maximum current of the induction motor. In the characteristic region, the current is decreased (curve $C_2$). The reason why no problem arises in respect to the thermal load even when the current I is increased to the upper limit can be explained by the fact that the acceleration at the start is low, assuring a sufficient margin for the induction motor and that the duration of coasting operation after the notching-off is long, whereby heat generated in the motor can be dissipated sufficiently during this period.

In case the inter-station distance is medium (corresponding to an intermediate-distance high-speed transit service), a value intermediate between the values in the two cases described above is adopted (curves $B_1$ and $B_2$).

In other words, the set of curves $A_1$ and $A_2$ are prepared for the short distance operation, the set of curves $B_1$ and $B_2$ are prepared for the intermedaite distance operation, and the set of curves $C_1$ and $C_2$ are prepared for the long distance operation. It goes without saying that other sets of curves such as $D_1$ and $D_2$ may be prepared, as occasion requires.

Figure 1:
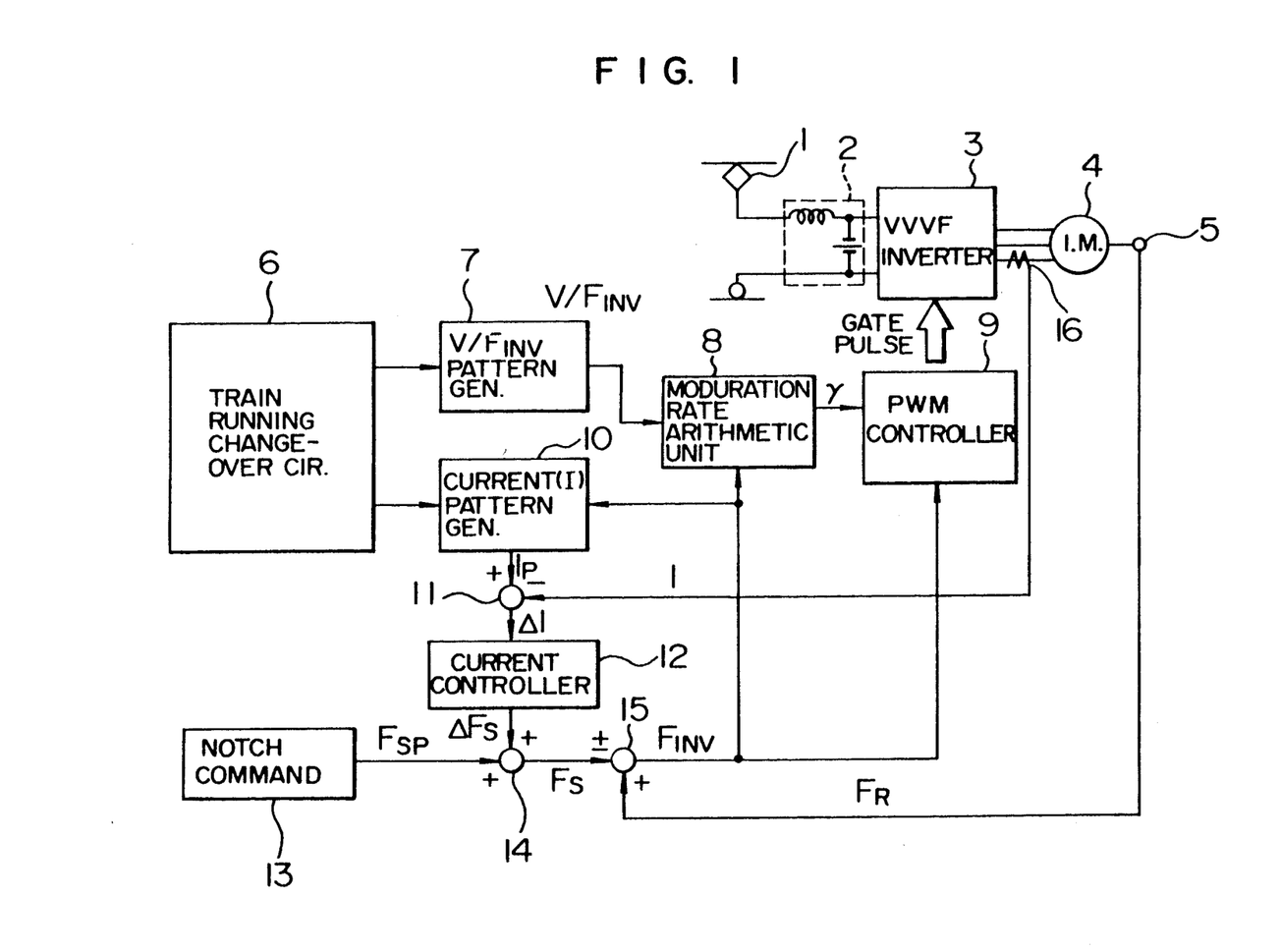
FIG. 1 is a block diagram showing an arrangement of an electric rolling stock control apparatus according to an embodiment of the invention.

FIG. 1 shows in a block diagram a control apparatus for effectuating the operation characteristics described above. A DC current collected from a catenary via a pantograph 1 is smoothed through a filter circuit 2 and inputted to an inverter 3 of variable voltage/variable frequency to be converted into a three phase AC current for controlling an induction motor 4.

A $V/F_{INV}$ pattern generating circuit 7 stores therein values of the ratios of $V/F_{INV}$ for the curves $A_1$, $B_1$ and $C_1$ shown in FIG. 3 (the number of which is not limited to three). On the other hand, current patterns corresponding to the curves $A_2$, $B_2$ and $C_2$ illustrated in FIG. 3 (the number of which is not limited to three either) are stored as current commands in a current pattern generating circuit 10. Selection of these patterns is performed by a train running change-over circuit 6 in a manner which will be described in detail hereinafter, whereby the value of $V/F_{INV}$ corresponding to the selected pattern as well as the current command $I_P$ corresponding to the inverter frequency $F_{INV}$ is generated. This current command $I_P$ and a current I detected by a current detector 16 are compared with each other by a comparator 11. A difference $\Delta I$ resulting from the comparison is inputted to a current controller 12 to be multiplied with a predetermined gain to produce a signal $\Delta F_S$. A notch signal 13 produced by a main controller serves as a slip frequency command $F_{SP}$ which is added with the signal $\Delta F_S$ by an adder 14 to produce a slip frequency $F_S$. An rpm rotational frequency $F_R$ of the induction motor 4 which is detected by a speed sensor 5 and the slip frequency mentioned above undergo addition or subtraction to produce the inverter frequency $F_{INV}$.

On the other hand, the selected value of $V/F_{INV}$ (ratio between the output voltage V and the inverter frequency $F_{INV}$) is outputted from the $V/F_{INV}$ pattern generating circuit 7 to be inputted to a modulation rate arithmetic unit 8, whereby a value resulting from multiplication of the inverter frequency $F_{INV}$ with the ratio of $V/F_{INV}$ is outputted as a modulation rate $\gamma$. In this conjunction, it should be mentioned that in place of performing the arithmetic operation mentioned above, corresponding curves may be stored to allow the modulation rate $\gamma$ to be outputted in accordance with the selected curve. The modulation rate $\gamma$ and the inverter frequency $F_{INV}$ are inputted to a pulse width modulation (PWM) circuit 9 to produce gate pulses for thereby operating the inverter 3.

According to the instant embodiment of the invention, an electric rolling stock profitably suited for various train operations or services can be obtained because of the possiblity of selection of the tractive effort characteristics of the electric rolling stock.

Figure 5:
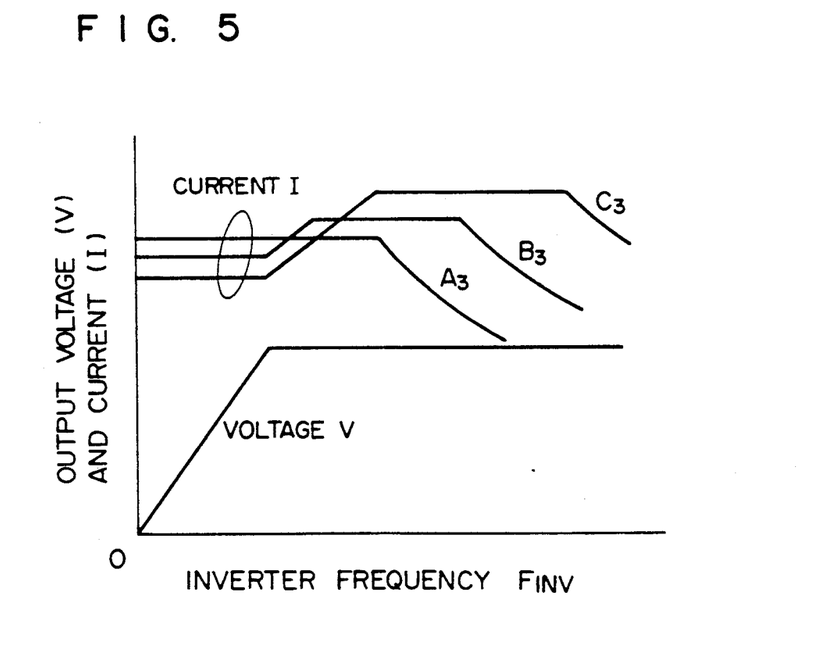
FIG. 5 is a view for illustrating graphically output voltage and current patterns utilized in another embodiment of the invention.

Next, another embodiment of the invention for realizing the inverter frequency vis-á-vis tractive effort characteristics illustrated in FIG. 2 will be described by reference to FIGS. 5 and 6. As can be seen from the expression (3) mentioned previously, the torque T exerted on the shaft of the induction motor is in proportion to a product of the ratio of the output voltage V and the inverter frequency $F_{INV}$ and the output current I. Thus, it is possible to vary the torque T of the induction motor by controlling the current I. In FIG. 5, there are illustrated relation between the inverter frequency $F_{INV}$ on one hand and the output voltage and current V and I on the other hand in the control based on the above-mentioned principle.

The characteristics shown in FIG. 5 differ from those illustrated in FIG. 3 in that only the output current pattern I is varied for changing the tractive effort characteristics without varying the ratio of $V/F_{INV}$ which is in coincidence with the curve $A_1$, while a curve $A_3$ shown in FIG. 5 is prepared to coincide with the constant current value in the variable voltage/variable frequency region shown in FIG. 3. This is for the purpose of obtaining a maximum acceleration in a low speed range.

The current pattern in the case where the electric rolling stock is operated in a short distance commuter train corresponds to a pattern $A_3$. Accordingly, the current value in a low speed range is increased for obtaining a high acceleration, as explained hereinbefore. However, in consideration of overheating of the induction motor, the current is decreased at an earlier stage in a high speed range. In contrast, the current pattern for the case where the electric rolling stock is used for a long distance express train service corresponds to the curve $C_3$. In this case, the current is reduced in order to afford a margin to the thermal load of the induction motor in a low speed range, while in a high speed range, the current is increased correspondingly to enhance the high speed operation performance of the electric rolling stock.

A structure of the control apparatus for realizing the operations described above is shown in FIG. 6, in which like as those shown in FIG. 1 are denoted by like reference symbols.

Figure 6:
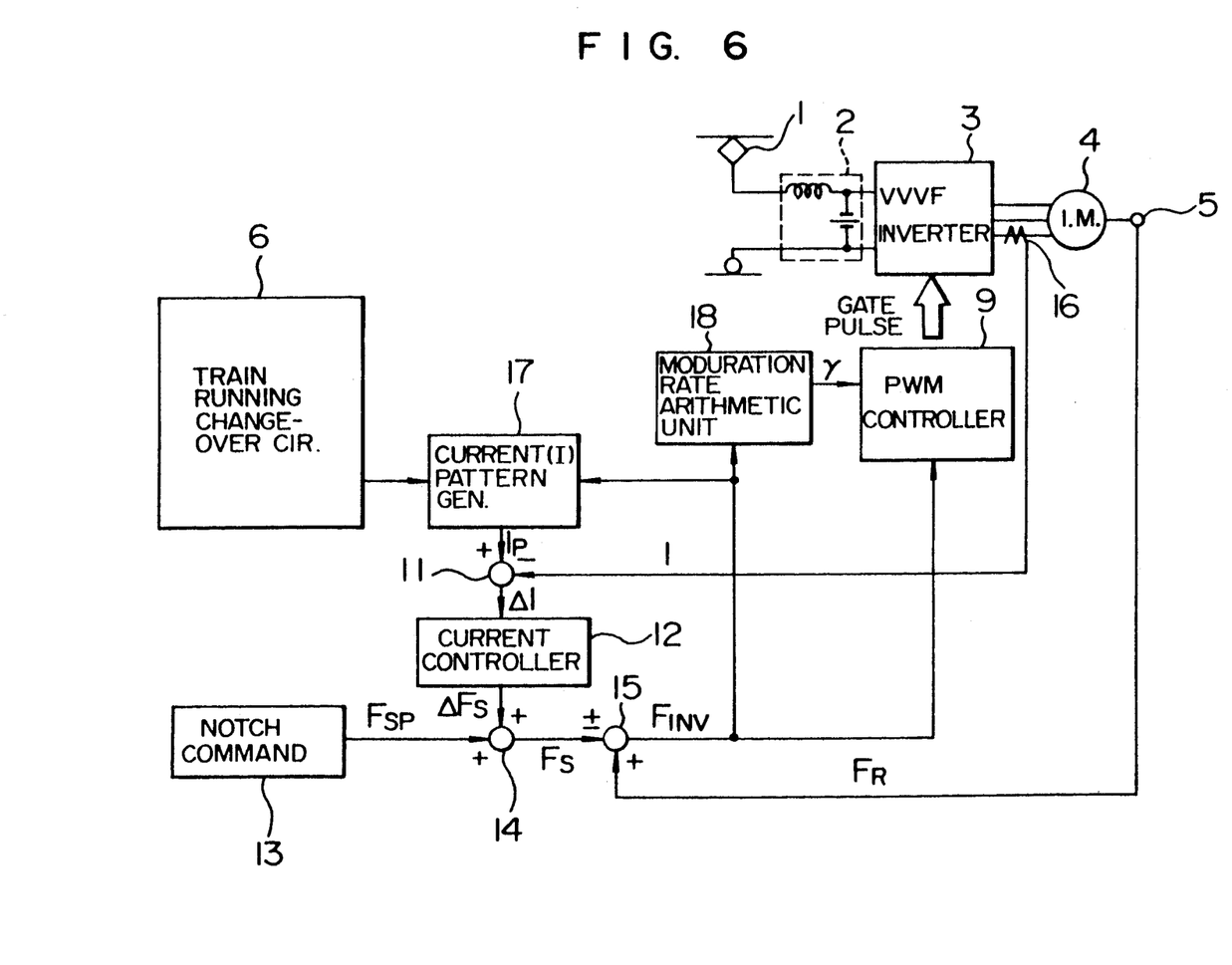
FIG. 6 is a block diagram showing another embodiment of the electric rolling stock control apparatus according to the invention.

The structure shown in FIG. 6 differs from that shown in FIG. 1 in that the $V/F_{INV}$ pattern generating circuit 7 is spared, the contents stored in the current pattern generating circuit 17 are modified and that one of the $V/F_{INV}$ ratios is placed in the modulation rate arithmetic unit 18.

Referring to FIG. 6, current patterns illustrated in FIG. 5 are stored in the current pattern generating circuit 17, wherein the pattern selected by the train running change-over circuit 6 is outputted as the current command $I_P$ in dependence on the inverter frequency $F_{INV}$. Although only three current patterns are shown in FIG. 5, it will readily be understood that the number of these patterns may be increased in accordance with operation modes as desired.

The instant embodiment is advantageous over the preceding one in that the number of parts for constituting the control apparatus can be reduced.

Now, differences between the patterns shown in FIGS. 3 and 5 will briefly be described.

The curve $A_3$ shown in FIG. 5 represents the utterly same pattern as the curve $A_2$ shown in FIG. 3. However, the curves $B_3$ and $C_3$ shown in FIG. 5 differ from the curves $B_2$ and $C_2$ shown in FIG. 3 in that the curves $B_3$ and $C_3$ lie below the curve $A_3$ in the same inverter frequency region. In other words, in this region, the patterns shown in FIG. 3 represent relatively low voltage and large current characteristics, while the corresponding patterns shown in FIG. 5 represent high voltage and small current characteristics.

To say in another way, the control scheme illustrated in FIG. 3 involves an increased proportion of copper loss (ohmic loss) in the motor loss, while in the control scheme illustrated in FIG. 5, iron loss (core loss) occupies a greater proportion.

In the variable voltage/variable frequency inverter control, the inverter frequency $F_{INV}$ remains low in a region where the $V/F_{INV}$ ratio is constant. However, a chopping frequency for the modulation is high. Thus, it can be said that in this region, effect of the iron loss is predominant. Accordingly, the low iron loss type control scheme illustrated in FIG. 3 is very profitable in this region. In practice, selection of the pattern illustrated in FIG. 3 or that of FIG. 5 should be made in consideration of the loss characteristics of the induction motor as used as well as the control method.

Parenthetically, for permitting the above-mentioned selection, the induction motor should be so constructed that it is compatible with both the maximum value of $V/F_{INV}$ (i.e. maximum value of magnetic flux) and the maximum value of the slip frequency. Further, the current capacity of the inverter should be compatible with the maximum motor current.

The change-over of the operation characteristics of the electric rolling stock described hereinbefore is performed with a change-over switch which is installed on a driver's cab.

In the case of the control apparatus according to the first embodiment of the invention shown in FIG. 1, the $V/F_{INV}$ patterns and the current patterns can be changed over separately independent of each other. It is however preferred from the view point of manipulation to change over simultaneously both the patterns for every train operation. On the other hand, in the case of the control apparatus according to the second embodiment of the invention shown in FIG. 6, the change-over of the current patterns results directly in the changing-over of the train operation characteristics.

The driver can change over the train operation or running modes by manipulating push button switches while taking into consideration the situations on the track or railroad on which the train is running such as inter-station distance, the number of the stations where the train does not stop and others by consulting a time table or train schedule table.

The change-over mentioned above however imposes a burden on the driver in the sense that his or her work is complicated. Under the circumstances, the change-over of operation modes of the electric rolling stock should preferably be performed in an automated manner.

In the following, a variety of automatic operation mode change-over apparatus will be described.

In a train operation schedule table or diagram, a train number is given by a number representing the type of the train of concern and specifying the arrival/start times at the stations where the train of concern is to stop. This train number does not coincide with that of the railcar used in the train. Further, a same train identification number is never used for identifying more than one train. The automatic operation mode change-over is realized according to the invention by taking advantage of the fact mentioned above.

Now, description will be directed to a first embodiment of the automatic train operation mode change-over apparatus according to the invention in which a train operation management system is used.

As is well known, the train operation management system is designed for managing all the trains such that they are operated in accordance with a train operation schedule and so arranged to this end as to acquire information about delays or other running situations of any given trains by collating the positional information and the train identification numbers with the train operation schedule table.

The train operation management system contains information of the operation schedules of all the trains and the positions or locations thereof.

Figure 7:
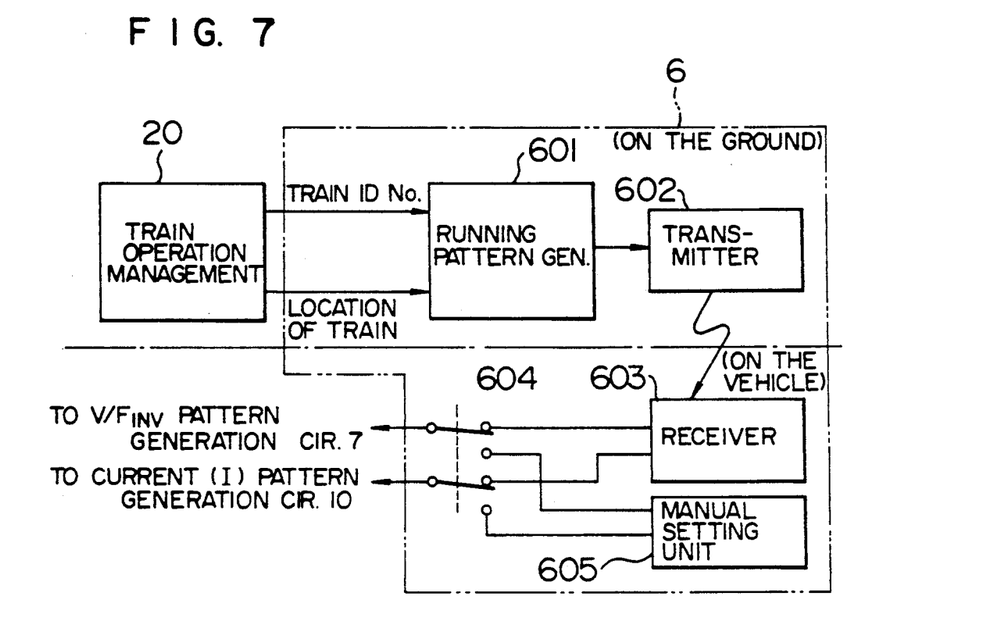
FIG. 7 is a block diagram showing a running mode automatic change-over apparatus according to an embodiment of the invention.

Now, reference is made to FIG. 7 in which like or corresponding parts as those in FIGS. 1 and 6 are designated by like reference symbols.

A train running change-over circuit 6 is supplied with signals representing the identification number of a train under control and the location thereof from a train operation management system 20. These signals are then inputted to a running pattern generating circuit 601 which responds thereto by outputting a running or operation mode at an interval between predetermined stations, as described hereinafter. This running mode is transmitted from a transmitter 602 installed on the ground to the electric rolling stock to be controlled and received by a receiver 603 installed thereon to be inputted to the $V/F_{INV}$ pattern generating circuit 7 and the current pattern generating circuit 10 of the electric rolling stock operation mode change-over unit by way of a manual/automatic change-over switch 604. In response to the reception of the command mentioned above, the operation mode of the electric rolling stock of the train is changed in the manner described hereinbefore. Further, a signal set up by the manual set-up device 605 is outputted similarly through the manual-/automatic change-over switch 604.

In the case of the embodiment shown in FIG. 6, only the current pattern is outputted.

Figure 8:
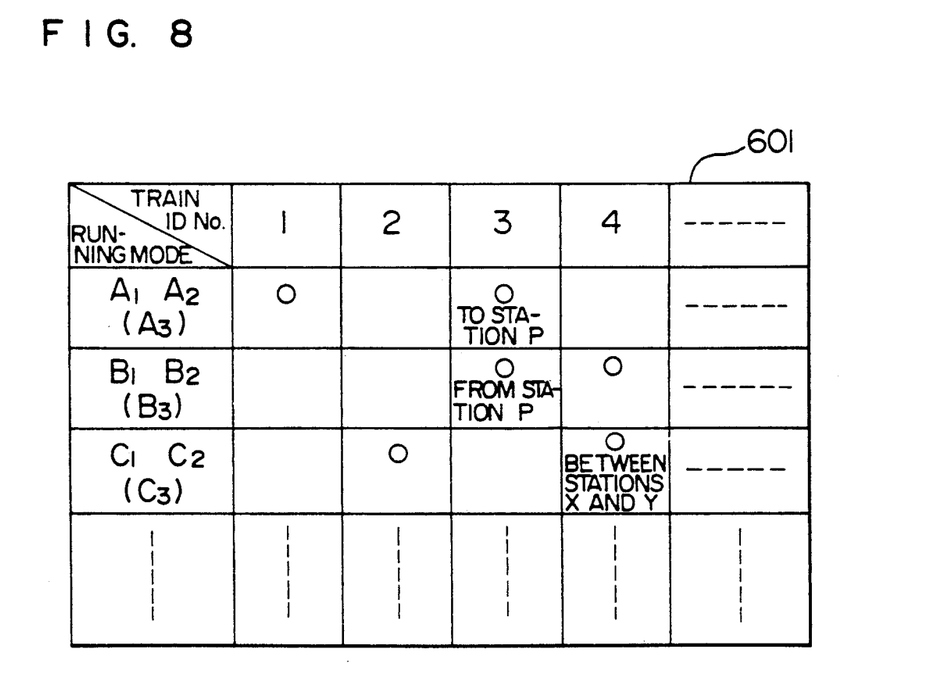
FIG. 8 is a view showing a look-up table stored in a running pattern generating circuit.

Now, description will be made of the running (operation) pattern generating circuit 601 by reference to FIG. 8.

The running pattern generating circuit 601 stores therein a collation table of the train, which table contains train identification numbers and the running modes (tractive effort characteristics).

The running pattern generating circuit 601 is supplied with a train number identifying a train to be controlled. Subsequently, the circuit 601 receives the information as to which station the train of concern is currently located, to thereby determine the operation mode of the train to the next station where the train is to stop. Change-over of the operation mode is performed upon arriving at the station during a pause in which the passengers get on and off the train.

It is assumed that an operation mode of an accommodation train (a way train) represented by the curves $A_1$ and $A_2$ ($A_3$) is selected for the train assigned with the train number "1", electric rolling stock of a train having the train number "2" is assigned with an express operation mode represented by the curve $C_1$ and $C_2$ ($C_3$), electric rolling stock of a train having the identification number "3" is assigned with the accommodation train operation up to the station "p" corresponding to the curves $A_1$ and $A_2$ ($A_3$) and destined to run in a high speed mode represented by the curves $B_1$ and $B_2$ ($B_3$) after the train has passed by the station P, and that the electric rolling stock of the train numbered "4" is to run for a long inter-station distance (X-Y distance) in the express transit mode between the stations X and Y in accordance with the curve $C_1$ and $C_2$ ($C_3$). The running or operation modes mentioned above can be selected by changing over the inverter frequency vis-á-vis output voltage/current characteristics illustrated in FIG. 3, where parenthesized characteristics correspond to those illustrated in FIG. 5.

Figure 9:
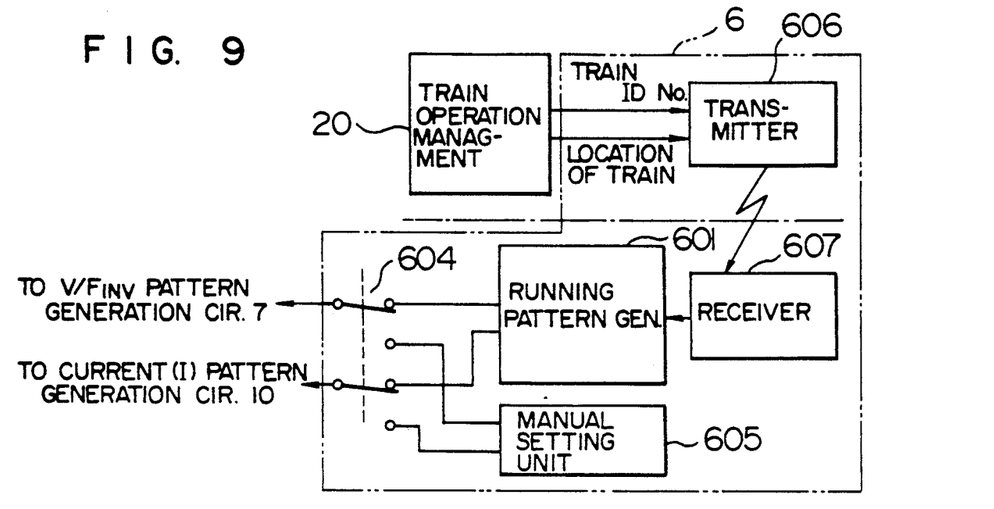
FIGS. 9 and 10 show further embodiments, respectively, of the running mode automatic change-over unit according to the invention.

Another embodiment of the train running change-over circuit 6 will now be described by reference to FIG. 9, in which like or equivalent parts as those shown in FIG. 7 are designated by like reference symbols.

In the case of the instant embodiment, the running pattern generating circuit 601 is installed on the electric rolling stock. Correspondingly, the transmitter and the receiver 606 and 607 are designed to transmit and receive information of the train identification numbers and the locations thereof.

According to the instant embodiment of the invention, there is obtained an advantageous effect that failure of a part of the running or operation pattern change-over apparatus can not exert influence to the other electric rolling stock.

The train operation management apparatus described above may be implemented in the form of IC cards, examples of which will be elucidated below.

Figure 10:
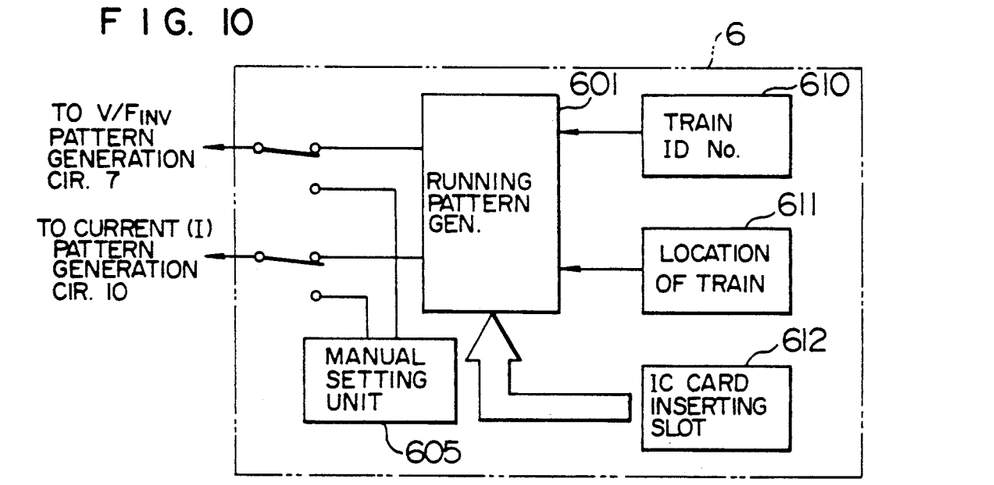

Referring to FIG. 10, no information or data is initially stored in a memory incorporated in the running pattern generating circuit 601. Only at the start of operation, the running pattern is stored by inserting an IC card storing the pattern. When the driver designates the train identification number 610 through the medium of a keyboard or other IC card, a running mode is outputted because the initial start station is determined previously. Upon arriving at the next station, the name thereof can be identified by a train location detecting unit 611 known per se, whereon the running mode is changed over in response to the running mode inputted to the running pattern generating circuit. The location of the train may be inputted manually by the driver upon every arrival at the station. In this conjunction, it will be convenient to provide push buttons which are arrayed in the order of every station at which the train arrives sequentially.

Figure 11:
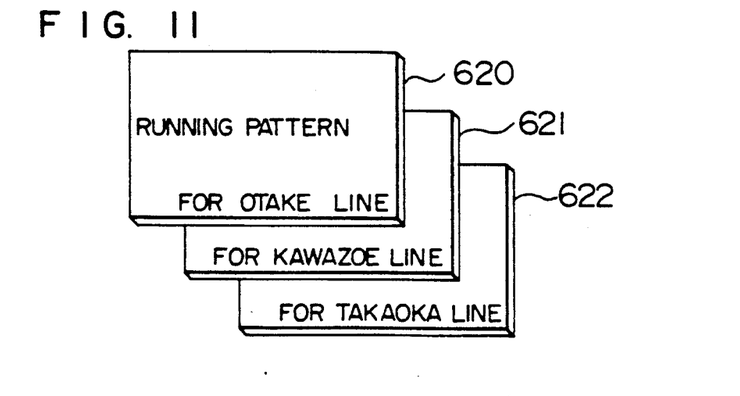
FIG. 11 is a view showing IC cards storing running patterns for different lines.

Further, the IC cards to be inserted upon start of the train operation may be prepared, as shown at 620 to 622 in FIG. 11, in dependence on the districts or the lines the trains are to be operated.

By the way, in view of difficulty in confirming the location or position of a train, it is conventional in many of the railways to provide an automatic train control system (ATC) or and automatic train stop system (ATS). Accordingly, so far as local monitor stations are provided at every predetermined interval, the locations of the trains can be confirmed without fail. Every time the electric rolling stock passes by the monitor station, the location or position of the train can be confirmed. By counting the number of the monitor points starting from the starting station, it is possible to change over the operation modes of the train through collation with the operation pattern.

Further, by counting the time duration from the start of running to the end of acceleration, operation modes of the electric rolling stock may be automatically changed over in consideration of the current state of the train operation.

We claim:

1. An apparatus for controlling an electric rolling stock driven by an induction motor, comprising an inverter of variable voltage/variable frequency, the induction motor controlled by said inverter, means for adjusting a slip frequency of said induction motor so that said induction motor can follow a current command, means for generating an operation frequency of said inverter on the basis of said slip frequency and a value representative of a rotational speed of said induction motor and means for causing said inverter to output a voltage which is in proportion to the inverter frequency;

said control apparatus further comprising torque command generating means for generating first and second torque commands depending on the inverter frequency and means for changing over said first and second torque commands, said second torque command being for a larger torque for a relatively low frequency range of the inverter frequency and being for a smaller torque for a relatively high frequency range of the inverter frequency, as compared with said first torque command.

2. The apparatus according to claim 1, wherein said torque command generating means includes means for varying, for a relatively low frequency range of the inverter frequency, a ratio between said operation frequency and said output voltage of said inverter.

3. The apparatus according to claim 1, wherein said torque command generating means includes:
means for changing a ratio between said inverter frequency and said inverter output voltage and for changing said current command set over an operation frequency of said inverter.

4. An apparatus for controlling an electric rolling stock, comprising an inverter of variable voltage/variable frequency, an induction motor controlled by said inverter, means for adjusting a slip frequency of said induction motor so that said induction motor can follow a current command, means for generating an operation frequency of said inverter on the basis of said slip frequency and value representative of a rotational speed of said induction motor and means for causing said inverter to output a voltage which is in proportion to the inverter frequency;

said control apparatus further comprising:

voltage generating means storing a plurality of ratios of said inverter frequencies and said inverter output voltages for generating one of said ratios;

current pattern generating means storing a plurality of current command patterns corresponding to values representative of said inverter frequencies for generating one of said current command patterns; and selecting means for selecting the ratio between said inverter frequency and said inverter output voltage and said current pattern.

5. The apparatus for controlling an electric rolling stock according to claim 4, wherein the number of said ratios which said voltage generating means can generate is equal to that of said patterns capable of being generated by said current pattern generating means.

6. The apparatus for controlling an electric rolling stock according to claim 4, wherein said selecting means selects one of sets each including one of the ratios between said inverter frequencies and said inverter output voltages and one of said current patterns.

7. The apparatus for controlling an electric rolling stock according to claim 6, wherein said sets are determined in accordance with running performances of said electric rolling stock.

8. The apparatus for controlling an electric rolling stock according to claim 6, wherein said sets include, respectively, the ratios of said inverter frequencies and said inverter output voltage selected sequentially in a descending order, starting from a greatest ratio, within variable voltage/variable frequency region of said inverter and the current command patterns selected sequentially in an ascending order, starting from a smallest current pattern, within a region in which the output voltage of said inverter is constant.

9. An apparatus for controlling an electric rolling stock, comprising an inverter of variable voltage/variable frequency, an induction motor driven by said inverter, means for adjusting a slip frequency of said induction motor so that said induction motor can follow a current command, means for generating an operation frequency of said inverter on the basis of said slip frequency and a value representative of a rotational speed of said induction motor and means for causing said inverter to output a voltage which is in proportion to the inverter frequency;

said control apparatus further comprising:

voltage generating means storing a plurality of ratios of said inverter frequencies and said inverter output voltages for generating one of said ratios;

current pattern generating means storing a plurality of current command patterns corresponding to a value representative of said inverter frequencies for generating one of said current command patterns;

storage means for storing running patterns according to which said electric rolling stock is operated;

means for detecting location of said electric rolling stock; and means for changing-over the ratios of said inverter frequencies and said inverter output voltage as well as said current patterns in accordance with the output of said storage means.

10. An apparatus for controlling an electric rolling stock, comprising an inverter of variable voltage/variable frequency, an induction motor driven by said inverter, means for adjusting a slip frequency of said induction motor so that said induction motor can follow a current command, means for generating an operation frequency of said inverter on the basis of said slip frequency and a value representative of a rotational speed of said induction motor and means for causing said inverter to output a voltage which is in proportion to the inverter frequency;

said control apparatus further comprising:

voltage generating means storing a plurality of ratios of said inverter voltages to said inverter frequencies for generating one of said ratios;

current pattern generating means storing a plurality of patterns of said current command corresponding to said inverter frequencies for generating one of said patterns;

means for setting up a train identification number;

storage means for storing running modes corresponding to said train identification number and an interval in which said electric rolling stock is running; and means for changing-over the ratios of said inverter frequencies and said inverter output voltages as well as said current patterns in accordance with the output of said storage means.

11. The apparatus for controlling an electric rolling stock according to claim 10, wherein said train identification number set-up means and said storage means are incorporated in a train operation management apparatus installed on the ground for controlling operations of trains based on a train operation diagram.

12. The apparatus for controlling an electric rolling stock according to claim 10, wherein said train identification number set-up means is incorporated in a train operation management apparatus installed on the ground for controlling operations of trains based on a train operation diagram, while input means for receiving command issued from said train management apparatus and said storage means are provided in said electric rolling stock.

13. The apparatus for controlling an electric rolling stock according to claim 10, wherein said train identification number set-up means is effectuated by card-like storage means in which the train identification number for said electric rolling stock is stored.

14. The apparatus for controlling an electric rolling stock according to claim 13, wherein the running modes to be stored in said storage means are supplied from card-like storage means which stores a running mode for each of railroads.

15. An apparatus for controlling an electric rolling stock, comprising an inverter of variable voltage/variable frequency, an induction motor driven by said inverter, means for adjusting a slip frequency of said induction motor so that said induction motor can follow a current command, means for generating an operation frequency of said inverter on the basis of said slip frequency and a value representative of a rotational speed of said induction motor and means for causing said inverter to output a voltage which is in proportion to the inverter frequency;

said control apparatus further comprising:

current command pattern generating means storing a plurality of patterns of said current command corresponding to said inverter frequencies for generating one of said patterns;

storage means for storing running modes of said electric rolling stock; and means for changing-over said current command patterns in accordance with the location of said electric rolling stock and the output of said storage means.

16. An apparatus for controlling an induction motor, comprising an inverter of variable voltage/variable frequency, an induction motor driven by said inverter, means for adjusting a slip frequency of said induction motor so that said induction motor can follow a current command, means for generating an operation frequency of said inverter on the basis of said slip frequency and a value representative of a rotational speed of said induction motor and means for causing said inverter to output a voltage which is in proportion to the inverter frequency, said control apparatus further comprising:

voltage generating means storing a plurality of ratios of said inverter frequency and said inverter output voltage for generating one of said ratios;

current pattern generating means storing a plurality of current command patterns corresponding to said inverter frequencies thereof for generating one of said current command patterns; and selecting means for selecting the ratio between said inverter frequency and said inverter output voltage and said current pattern.

17. The apparatus according to claim 1, wherein said torque command generating means includes means for generating first and second current commands, said second current command being for a higher current for a relatively low frequency region of the inverter frequency and being for a lower current for a relatively high frequency range of the inverter frequency, as compared with said first current command.

* * * * *